(No Model.)
J. OLDHAM.
SAW.
No. 571,200. Patented Nov. 10, 1896.
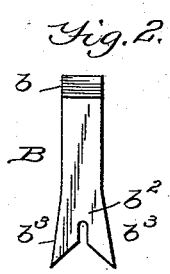
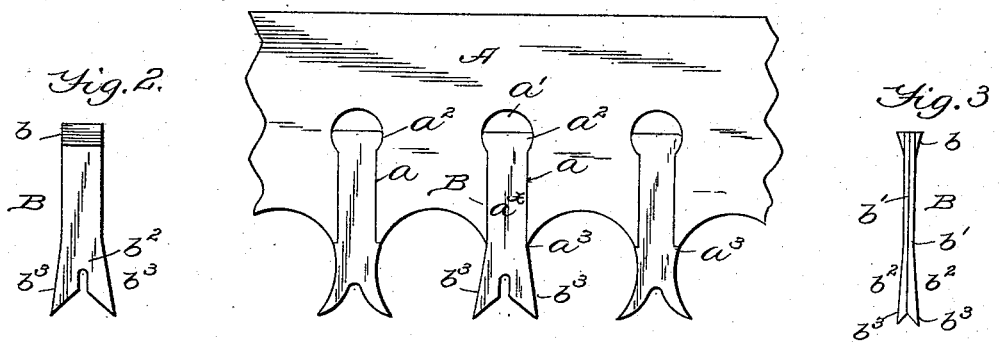
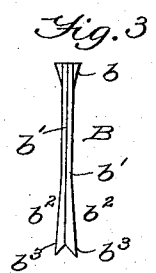
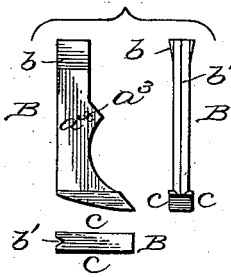
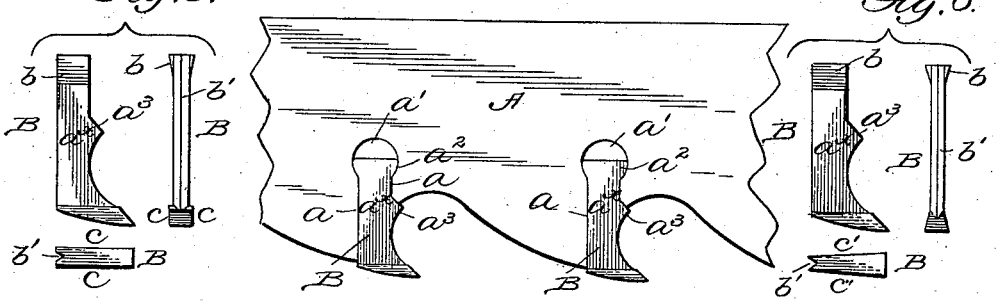
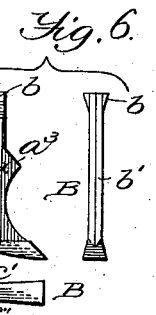
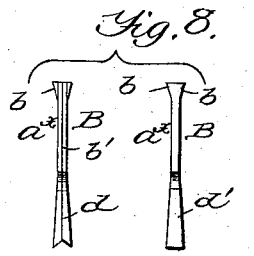
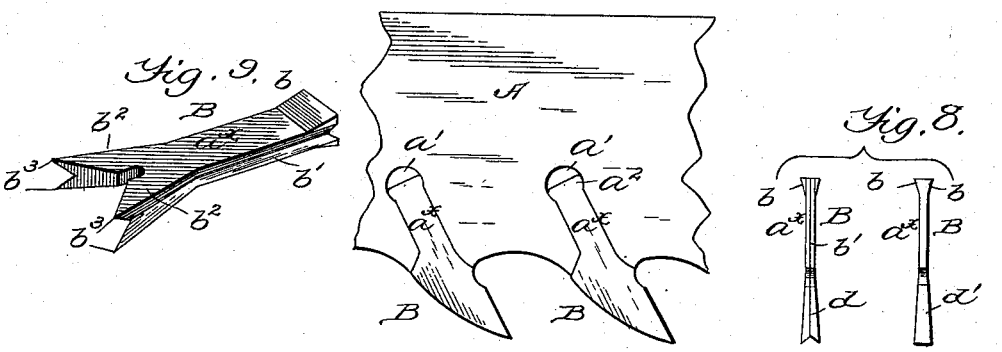
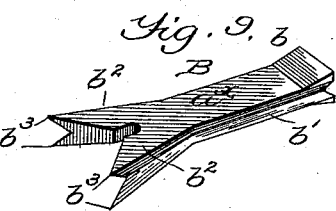
WITNESSES:
Margaret B. Crawford.
Harry Burton.
INVENTOR
Joshua Oldham
BY
Wm M Kister
ATTORNEY.
THE NORRIS PETERS CO., PHOTO-LITHO., WASHINGTON, D. C.

UNITED STATES PATENT OFFICE.

JOSHUA OLDHAM, OF BROOKLYN, NEW YORK.

SAW.

SPECIFICATION forming part of Letters Patent No. 571,200, dated November 10, 1896.

Application filed August 12, 1896. Serial No. 602,563. (No model.)

*To all whom it may concern:*

Be it known that I, JOSHUA OLDHAM, a citizen of the United States, residing at 303 Macon street, Brooklyn, in the county of Kings and State of New York, have invented certain new and useful Improvements in Saws; and I do hereby declare the following to be a full, clear, and exact description of the invention, such as will enable others skilled in the art to which it appertains to make and use the same.

My invention relates to certain new and useful improvements in insertible teeth for saws—band, circular, gang, or crosscut—and it has for its object, among other things, to dispense with the use of additional or separate means to secure or hold the teeth in place in the blade, as, for instance, the primitive rivet, the curved separate shank, and like means; also to economize space in the arrangement of the teeth in the blade; also to increase the cutting capacity of the individual teeth, especially in crosscut-saws, and to obviate the swaging or setting of the teeth.

To these ends the invention consists, primarily, in the lateral enlargement or thickening of the shank of the tooth at the base and the enlargement of or forming an aperture at the base or lower end of the tooth-receiving socket or slot in the blade to provide for the reception and interlocking therewith of the metal of the tooth as its enlargement is compressed, so as to project the base of the tooth forward and rearward within said enlargement or aperture of the blade flush with the sides of the blade, and in certain details of construction in connection therewith, all substantially as hereinafter more fully disclosed, and specifically pointed out in the claims.

In the accompanying drawings, Figure 1 is a broken-away side view of a crosscut-saw embodying my invention or insertible tooth. Figs. 2 and 3 are a side and an edge view of the tooth, respectively. Fig. 4 is a broken side view of a saw with teeth having chisel-bit form of teeth embracing my invention. Fig. 5 is side, edge, and plan views of one tooth detached. Fig. 6 is similar views of another form of the tooth. Fig. 7 is a broken side view of a band, circular, or gang saw, also showing the application of my invention thereto. Fig. 8 is edge views of the teeth, one plain-faced and the other bifurcated. Fig. 9 is a detached perspective view of the middle tooth of Fig. 1.

In securing insertible saw-teeth as heretofore constructed in place in the slot or socket of the blade it was necessary to use a separate fastening, as a rivet, a throat-piece or separable elongated curved shank, or like means. This method of securing the teeth was also objectionable in taking up unnecessary amount of space for each tooth. These disadvantages I have overcome by my invention.

In carrying out my invention I produce the blade A, otherwise of ordinary construction, with a straight or radial socket or slot $a$, terminating at its inner end or base in a circular or angular enlargement or aperture $a'$, the outer end of said slot or socket being shaped according to the contour the shank of the teeth is required to take at that point.

B is the tooth of the insertible character, having the inner end or base of its shank portion enlarged or thickened laterally, as at $b$, the purpose of which is to permit after annealing and subjecting it to the action of a flat punch compression of the same, so as to cause it to project forward and rearward within the aperture or enlargement $a'$, which receives said enlargement, as at $a^2$, the forward and rearward projections $a^2$ thus produced being further compressed flush with the sides of the blade and substantially merged therewith, thus securing the tooth firmly in place.

The tooth has its shank $a^\times$ provided on the front or forward edge with a shoulder $a^3$, abutting the upper edge of the blade, to limit the extent of the insertion of the tooth. It will thus be seen that the use of the primitive rivet, a throat-piece, or elongated curved shank taking up unnecessary space, as previously employed, or other like means is wholly dispensed with. This construction also provides for the employment of a greater number of teeth in the same amount of space than can be provided for in the ordinary insertible toothed saw, as is obvious. The tooth B is of course channeled or grooved along its longitudinal edges, as at $b'$, to receive and interlock with a corresponding rib along the side edges of the slots or sockets $a$ of the blade A, as heretofore, to hold the teeth against lateral displacement.

The tooth B proper is flared or broadened outward laterally, also forwardly and rearwardly, from the blade A to its extreme outer edge, broadening the same thereat, as at $b^2$, to obviate the necessity of swaging the tooth, as heretofore, to give it the required "set," and this broadened-out portion is bifurcated, providing the tooth with four or a plurality of cutting edges $b^3$, two upon each face, thus increasing or doubling the cutting capacity of the tooth over the ordinary tooth.

In Figs. 7 and 8 is shown the principle of my invention as applied to a band, circular, or gang saw with or without the bifurcated feature thereof, as at $d$ $d'$, respectively.

In Figs. 4, 5, and 6 is disclosed the tooth of a band, circular, or gang saw with the sides of its chisel bit or point either parallel throughout, as at $c$, or tapered, as at $c'$, rearward to the same width of the blade, also embracing the principle of my invention.

I claim and desire to secure by Letters Patent—

1. In a saw, the insertible tooth chisel bit or point having its base or inner end provided with a lateral enlargement or thickened, in combination with the blade having the tooth-receiving slot or socket provided at its base with an enlargement thereof or aperture receiving the enlargement at the base of said tooth, said tooth enlargement adapted to be compressed or punched into a forward and a rearward projection, substantially as set forth.

2. In a saw, the insertible tooth having its base laterally enlarged or widened out and flared toward its upper cutting end in combination with the blade having its tooth-receiving slot or socket provided with an enlargement or aperture at its inner end or base receiving said enlargement of the tooth, said enlargement of the tooth adapted to be compressed into a forward and rearward projection, substantially as set forth.

3. In a saw, the insertible tooth having its upper end portion or point flared toward its extreme outer edge and also toward its forward and rear edges and bifurcated in its forward and rear faces, and having its base end laterally enlarged or thickened, in combination with the blade having the tooth-receiving socket or slot terminating in an enlargement or aperture at its inner end, said base-end enlargement of the tooth adapted to be compressed into a forward and rearward projection, substantially as set forth.

4. In a saw, the insertible tooth having a laterally enlarged or thickened inner end or base and its longitudinal edges provided with grooves or channels, in combination with the blade having the tooth-receiving slot or socket terminating at its inner end or base in an enlargement or aperture receiving the enlargement at the base end of said tooth, the longitudinal edges of said slot or socket having ribs engaging the longitudinal grooves or channels of said tooth, said enlargement at the base end of said tooth being compressed into forward and rearward projections, substantially as set forth.

5. In a saw, the insertible tooth having its outer end or point enlarged laterally and tapered rearwardly to the width of the blade and its base end laterally enlarged or thickened, in combination with the blade having the tooth-receiving slot or socket provided at its lower or inner end with an enlargement or aperture receiving the enlargement at the base end of said tooth, said enlargement of the tooth adapted to be compressed into a forward and a rearward projection, substantially as set forth.

In testimony whereof I affix my signature in presence of two witnesses.

JOSHUA OLDHAM.

Witnesses:
CHARLES F. AUKAMP,
JULIUS W. MANNEBACH.